(12) United States Patent
Hull, IV et al.

(10) Patent No.: US 10,904,221 B2
(45) Date of Patent: *Jan. 26, 2021

(54) SYSTEMS AND METHODS FOR FLEXIBLY SECURING DATA

(71) Applicant: Walmart Apollo, LLC, Bentonville, AR (US)

(72) Inventors: Ralph Grayson Hull, IV, Centerton, AR (US); Daniel David Manning, Fayetteville, AR (US); Jason Todd, Lowell, AR (US); Tim Webb, Rogers, AR (US); Aaron Marcus Johnson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,077

(22) Filed: May 30, 2019

(65) Prior Publication Data

US 2019/0281022 A1    Sep. 12, 2019

Related U.S. Application Data

(63) Continuation of application No. 15/357,191, filed on Nov. 21, 2016, now Pat. No. 10,313,309.

(60) Provisional application No. 62/257,430, filed on Nov. 19, 2015.

(51) Int. Cl.
*H04L 29/06* (2006.01)
*G07F 7/08* (2006.01)
*G06Q 20/00* (2012.01)

(52) U.S. Cl.
CPC ............. *H04L 63/04* (2013.01); *G06Q 20/00* (2013.01); *G07F 7/0813* (2013.01)

(58) Field of Classification Search
CPC .................................. H04L 63/04; H04L 29/06
USPC .............................................................. 726/26
See application file for complete search history.

(56) References Cited

U.S. PATENT DOCUMENTS

| | | | |
|---|---|---|---|
| 8,775,805 | B2 | 7/2014 | von Mueller et al. |
| 8,788,428 | B2 | 7/2014 | Weston et al. |
| 10,313,309 | B2 | 6/2019 | Hull, IV et al. |
| 2004/0225776 | A1 | 11/2004 | DiRaimondo et al. |
| 2013/0041822 | A1 | 2/2013 | Wagner et al. |
| 2014/0279309 | A1* | 9/2014 | Cowen ............... G06Q 20/4016 705/30 |

(Continued)

FOREIGN PATENT DOCUMENTS

WO    2007/086207 A1    8/2007

OTHER PUBLICATIONS

U.S. Appl. No. 15/357,191, filed Nov. 21, 2016, U.S. Pat. No. 10,313,309.

*Primary Examiner* — Evans Desrosiers
(74) *Attorney, Agent, or Firm* — McCarter & English, LLP

(57) ABSTRACT

A mechanism for flexibly securing data is discussed. A data entry device analyzes data from a user with respect to a security industry whitelist and an originator list and an analysis result controls a masking level of the data. The security industry whitelist references types of data that is not subject to industry-defined encryption standards. The originator list references data originators that produce data requiring non-standard handling. The data from the user is transmitted to and further examined for non-compliance with a pre-defined criteria at a computing device.

20 Claims, 8 Drawing Sheets

(56) References Cited

U.S. PATENT DOCUMENTS

2015/0332223 A1    11/2015  Aaron et al.
2016/0034883 A1*  2/2016  Amos .................. G07F 19/206
                                                705/35

\* cited by examiner

SYSTEMS AND METHODS FOR FLEXIBLY SECURING DATA

RELATED APPLICATION

This application claims priority to U.S. patent application Ser. No. 15/357,191, filed Nov. 21, 2016, now U.S. Pat. No. 10,313,309, which claimed priority to U.S. Provisional Patent Application No. 62/257,430 entitled "Systems and Methods for Flexibly Securing Card Data," filed on Nov. 19, 2015, the contents of both applications hereby incorporated by reference in their entirety.

BACKGROUND

Business entities must protect data they receive before it is transmitted to other components for processing. Business entities must also protect their data receiving devices from installing unverified changes in software.

SUMMARY

In one embodiment, a system for flexibly securing data is provided. The system includes a data entry device (DED) in communication with a computing device. The DED is configured to receive a security industry whitelist and an originator list. The security industry whitelist references types of cards not subject to industry-defined security standards, and the originator list references data originators that produce data requiring non-standard handling. The DED is further configured to acquire data from a user, analyze the data from the user using at least one of the security industry whitelist and the originator list, and, as result of the analyzing, control a masking level of the data. The DED is configured to transmit the data with the controlled masking level to the computing device. The computing device is configured to examine the data from the user for non-compliance with a pre-defined criteria, and transmit the data to an external server for authorization after analysis.

In another embodiment, a method for flexibly securing data is provided. The method includes receiving at a data entry device (DED) a security industry whitelist and an originator list. The security industry whitelist references types of data not subject to industry-defined security standards, and the originator list references data originators that produce data requiring non-standard handling. The method also includes acquiring data from a user via the DED, which is in communication with a computing device. The method includes analyzing the data from the user at the DED using at least one of the security industry whitelist and the originator list, and, as a result of the analyzing, controlling a masking level of the data. The method also includes transmitting the data with the controlled masking level to the computing device, examining the data from the user for non-compliance with a pre-defined criteria at the computing device, and transmitting the data to an external server for authorization after the analyzing.

In another embodiment, a system for flexibly securing data is provided, where the system includes a data entry device (DED) in communication with a computing device. The DED is configured to receive a security industry whitelist and an originator list. The security industry whitelist references types of cards not subject to industry-defined security standards, and the originator list references data originators that produce data requiring non-standard handling. The DED is configured to acquire data from a user, analyze the data from the user using at least one of the security industry whitelist and the originator list, and, as a result of the analyzing, control a masking level of the data. The DED is further configured to transmit the data with the controlled masking level to the computing device. The computing device is configured to transmit the data to an external server for authorization after analysis.

In yet another embodiment, a system for flexibly securing data is provided, where the system includes a data entry device (DED) in communication with a Point of Sale (POS) client. The DED is configured to receive a security industry whitelist, where the security industry whitelist references types of cards not subject to industry-defined security standards. The DED is further configured to acquire data from a user, analyze the data from the user using the security industry whitelist, determine that the type of the user data is referenced by the security industry whitelist and transmit the data in clear form to the computing device. The computing device is configured to transmit the data to an external server for authorization after analysis.

In another embodiment, a system for flexibly securing data is provided where the system includes a data entry device (DED) in communication with a computing device. The DED is configured to receive an originator list, where the originator list references data originators that produce data requiring non-standard handling. The DED is configured to acquire data from a user, analyze the data from the user using the originator list, and, as a result of the analyzing, control a masking level of the data. The DED Is configured to transmit the data with the controlled masking level to the computing device. The computing device is configured to transmit the data to an external server for authorization after analysis.

BRIEF DESCRIPTION OF DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DESCRIPTION OF EXEMPLARY EMBODIMENTS

Figure 1:
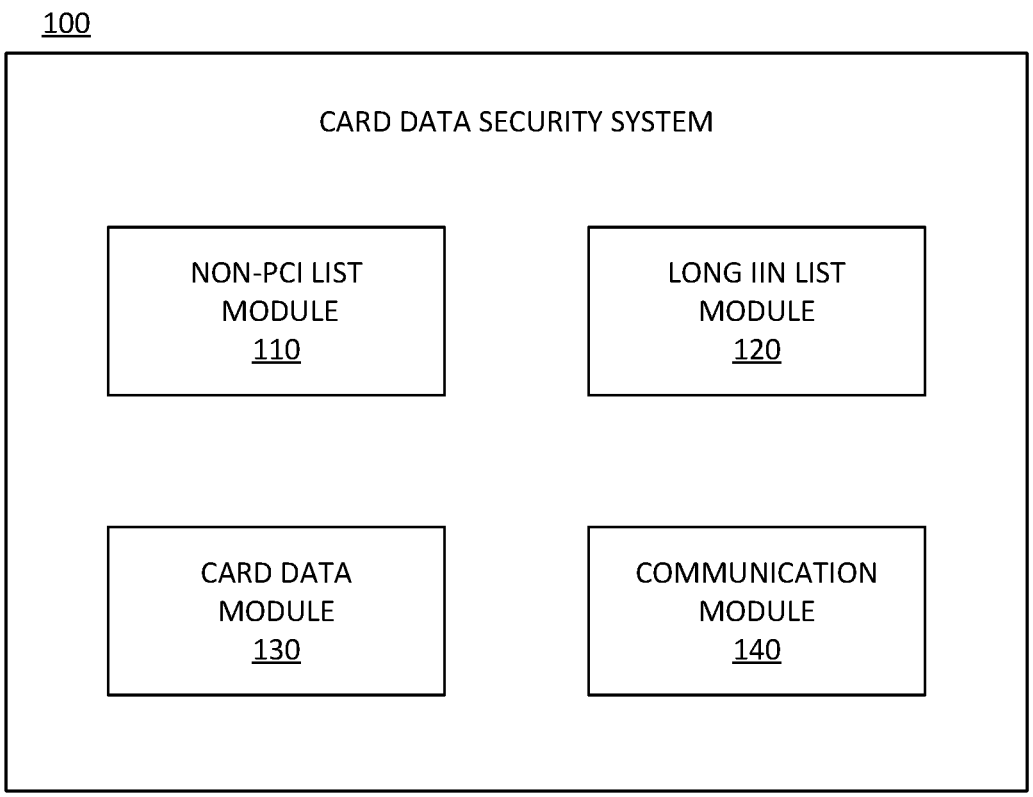
FIG. 1 is a block diagram showing a card data security system implemented in modules, according to an example embodiment.

Business entities must protect data by preventing unverified changes to devices that read the data and by preventing transmission of the data that should be protected if it is not encrypted or masked. For example, business entities must protect customer payment card data by preventing unverified changes to devices that read the payment cards and by preventing transmission of payment card data that should be protected if it is not encrypted or masked. This protection should ideally also exist without impacting or limiting internal business analyses performed by the business entity that are dependent on clear payment card data. Embodiments of the present invention verify in advance the legitimacy of changes to data entry devices, provide alerts of attempted changes and non-compliance issues involving received user data, enable internal business analyses to be performed in a business entity's large-scale data handling environment that relies on non-encrypted and non-masked (i.e.: clear) data, and flexibly mask user card data to comply with industry standards. The flexible data security system described herein improves security, specifically confidentiality and integrity, of customer payment card data in a true "Point to Point Encrypted" (P2PE) environment without sacrificing usability.

Described in detail herein are systems, methods, and computer readable medium for flexibly securing data received by an entity from a user. For ease of explanation, description throughout of the flexible system for securing data shall be made with reference to examples of securing user payment card data during a payment transaction process. Example embodiments provide for receiving a security industry whitelist, such as a non-Payment Card Industry (PCI) whitelist, an originator list, such as a long Issuer Identification Number (IIN) list, or both, at a data entry device (DED), such as a pin entry device (PED). The non-PCI whitelist and long IIN list are discussed further below. The DED acquires data from a user card, and analyzes the received data using resident logic and at least one of the security industry whitelist and the originator list. The result of the analysis flexibly controls the degree or level of encryption and/or masking required of the user card data including whether encryption or masking of the data is required at all. This secured (or unsecured) data is transmitted in the determined form to a computing device, such as a point-of-sale (POS) client, which further examines the card data for non-compliance with pre-defined criteria. In the event of non-compliance an alert is generated before the data is transmitted to an external server for authorization. Embodiments may also validate software and firmware distributed from a centralized location to the DEDs, prior to installation, through inspection of digital signatures at the DED. The DED may generate alerts on any interaction with data and/or requests to update data files or perform maintenance, including alerts on the validity of the digital signature of the alert/data.

A user card, as used herein, may be any payment card that can be used in completing a transaction. The data acquired from the user card (which may include track data) includes at least a primary account number (PAN), cardholder name, and expiration date. The track data may also include other data for authentication and authorization purposes. Consistent with current PCI requirements, the flexible card data security system described herein encrypts the PAN in its entirety in most cases. However, according to an exemplary embodiment, the flexible card data security system described herein transmits the PAN in the clear (unencrypted) if the user card is on the non-PCI whitelist. According to another exemplary embodiment, if the user card is on the long IIN list, the flexible card data security system described herein transmits an identifier corresponding to the long IIN, along with the IIN in the clear (the IIN is usually the first six digits of the PAN) and a copy of the encrypted PAN. According to another exemplary embodiment, the flexible card data security system described herein transmits the IIN in the clear along with the encrypted PAN to the POS client for further processing if the card is not referenced by either the non-PCI whitelist or the long IIN list. In some embodiments, data acquired from the user card, other than the PAN such as cardholder name and expiration date, may not be encrypted, and may be transmitted in the clear.

Exemplary data entry device's include a pin entry device (PED). A PED is a device that accepts payment cards (debit card, credit card, smart cards, chip cards, etc.) in adherence to current Payment Card Industry (PCI) standards. The PED includes a personal identification number (PIN) pad.

In embodiments of the present invention, a non-PCI list (also referred herein as a non-PCI whitelist and security industry whitelist) is a file containing IINs that identify payment cards that are not considered to be subject to the PCI-Data Security Standard (DSS) for masking or encryption purposes. IINs identify the issuer of the card such as a bank or private company. If the IIN of the user card is found on the non-PCI list, then the full account number may be provided in the clear in a message to the POS client. The POS client uses the unmasked/non-encrypted account number for internal business analysis. User cards that may be referenced by the non-PCI list for which encryption and masking is not required under industry standards may include, but are not limited to, gift cards, shopping reward cards, and associate or employee discount cards.

In embodiments of the present invention the long IIN list is a file containing card IINs that use a greater number of digits than a PCI-standard-defined number of digits. The long IIN list also includes reference identifiers corresponding to each IIN in the list. If the user card has an IIN that is referenced by the long IIN list, then the corresponding reference identifier is identified by the flexible card data security system described herein, and inserted in a message along with an unmasked portion of the IIN and masked account number. This helps the POS client in identifying cards with long IINs, without exposing the card data or account number, for internal business analysis purposes. As a non-limiting example, assume that a PCI-DSS requires that at most the six most significant (leftmost) digits of a user's sixteen digit card account number may be used as the IIN for routing the card data to the appropriate payment network and/or bank network and that digits beyond those six (which would ordinarily represent a personal account number for the user) require masking. However, in one example, the IIN for a particular card not issued by a bank includes more than six digits, for example eight digits. As explained further below, the card data security system described herein may determine that the card number exists on the long IIN list maintained by the system, and identify the reference identifier corresponding to the eight digit IIN of the card. The flexible card data security system generates a message to the POS client for the payment authorization process, and in this example, the message includes the leftmost six digits of the IIN unmasked, the reference identifier to identify the issuer corresponding to the eight digit IIN of the card, as well as the at least partially masked account number including the remaining two digits of the IIN masked. It should be mentioned that the remaining account number digits may be completely masked or may be partially masked as set forth in an applicable PCI standard. For example, the account number may be partially masked with the least significant (rightmost) four digits unmasked. In some embodiments, the reference identifier is used for internal business analysis, and is not required by the PCI host environment or payment system for authorizing the payment transaction.

FIG. 1 is a block diagram 100 showing a flexible card data security system in terms of modules according to an example embodiment. The modules may be implemented in PED 710 and/or POS client 715 shown in FIG. 7 The modules include a non-PCI list module 110, long IIN module 120, a card data module 130, and a communication module 140. The modules may include various circuits, circuitry and one or more software components, programs, applications, or other units of code base or instructions configured to be executed by one or more processors included in PED 710 and/or POS client 715. In other embodiments, one or more of modules 110, 120, 130, 140 may be included in POS server 720, while other of the modules 110, 120, 130, 140 are provided in the PED 710 or POS client 715. Although modules 110, 120, 130, and 140 are shown as distinct modules in FIG. 1, it should be understood that modules 110, 120, 130, and 140 may be implemented as fewer or more modules than illustrated. It should be understood that any of modules 110, 120, 130, and 140 may communicate with one or more components included in system 700 (FIG. 7), such as PED 710, POS client 715, POS server 720, server 730, payment system 740, or database(s) 750.

The non-PCI list module 110 may be configured to manage, maintain, and analyze data related to non-PCI cards that are not subject to payment card industry-data security standards. The long IIN list module 120 may be configured to manage, maintain, and analyze data related to long IINs for card issuers whose cards are identified by more than PCI-defined numbers of digits.

The card data module 130 may be configured to acquire, manage, and analyze data related to a user card that is available via a PED (e.g., PED 710). The communication module 140 may be configured to transmit data to various components of the flexible card data security system.

Figure 2:
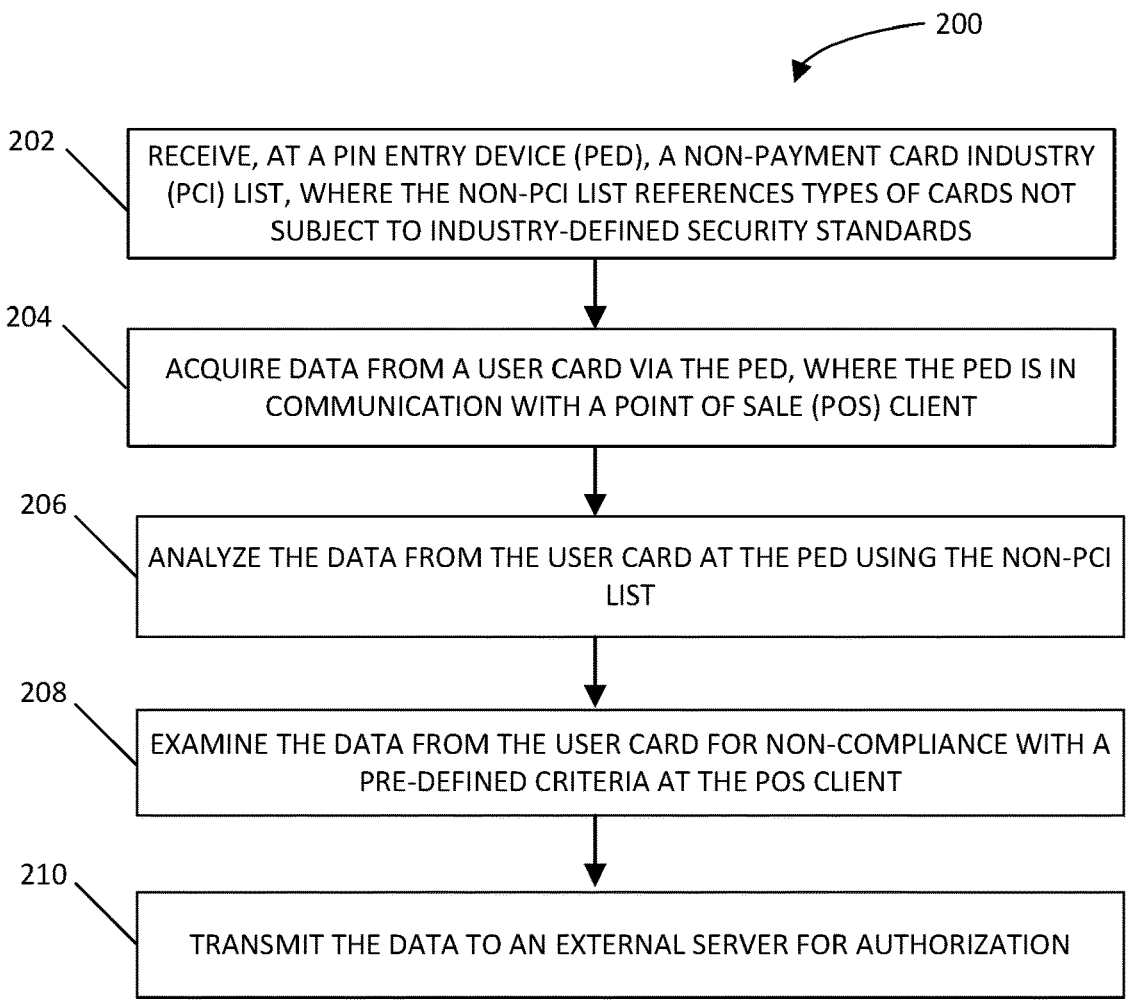
FIG. 2 is a flowchart showing an exemplary method for flexibly securing card data, according to an example embodiment utilizing a non-PCI whitelist.

In one embodiment, a PED may utilize a non-PCI whitelist to determine whether to secure data. FIG. 2 is a flow chart showing an exemplary method 200 for flexibly securing card data making use of a non-PCI whitelist. The method 200 may be performed using the modules in the flexible card data security system 100 shown in FIG. 1. The exemplary method 200 begins with the non-PCI list module 110 receiving at a PED (e.g., PED 710) a non-PCI list referencing the types of cards not subject to industry-defined security standards (step 202). At step 204, the card data module 130 acquires data from a user card via the PED (e.g., PED 710). For example, the card may be "swiped" at the PED and its data read from a magnetic stripe or the data may be manually entered via keys on the PED. The PED is in communication with a POS client (e.g., POS client 715). The method 200 continues with the card data module 130 analyzing the data from the user card at the PED (e.g., PED 710) using the non-PCI list (step 206). If the card data is referenced by the PCI whitelist then the card is not subject to industry security standards and does not need to be encrypted or masked. As a result, all of the card data may be sent "in the clear" (i.e. unmasked and non-encrypted) to the POS client. At step 208, the card data module 130 further examines the data from the user card for non-compliance with a pre-defined criteria at the POS client (e.g., POS client 715). For example, the card data may be examined for compliance with company or industry criteria as to whether it may be transmitted in the clear or at all to an external destination. If non-compliant data is found, an alert may be generated. In one embodiment, the alert may be signed. The communication module 140 transmits the data to an external server (e.g., server 730) for authorization for a payment transaction (step 210).

In one embodiment, the card data module 130 determines that the type of user card exists on the non-PCI list. In response, the communication module 140 generates a message containing the user card data in clear form, since the user card need not adhere to PCI standards. Alternatively, the card data module 130 may determine that the type of user card does not exist on the non-PCI list. In response, the card data module 130 analyzes the data from the user card at the PED using a long IIN list.

Figure 3:
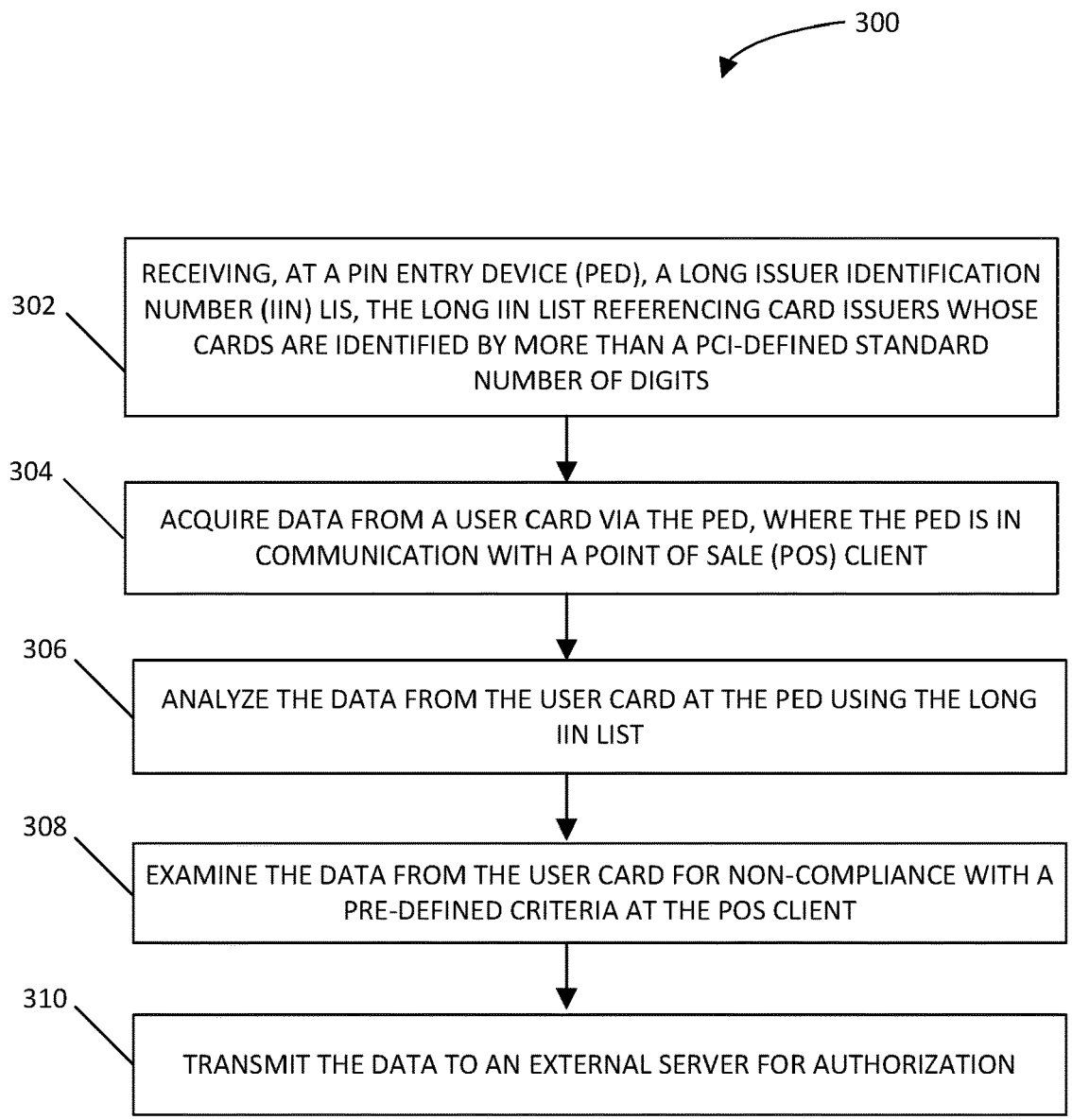
FIG. 3 is a flowchart showing an exemplary method for flexibly securing card data, according to an example embodiment utilizing a long IIN list.

In one embodiment, a PED may utilize a long IIN list to determine whether to mask data. FIG. 3 is a flow chart showing an exemplary method 300 for flexibly securing card data making use of a long IIN list. The method 300 may be performed using the modules in the card data security system 100 shown in FIG. 1. The exemplary method 300 begins with the long IIN list module 120 receiving at the PED (e.g., PED 710) a long IIN list referencing card issuers whose cards are identified by more than a PCI-defined standard number of digits. In some embodiments, the PCI-defined standard number of digits of a card is six digits. At step 304, the card data module 130 acquires data from a user card via the PED (e.g., PED 710). For example, the card may be "swiped" at the PED and its data read from a magnetic stripe or the data may be manually entered via keys on the PED. The PED is in communication with the POS client (e.g., POS client 715). The method 300 continues with the card data module 130 analyzing the data from the user card at the PED (e.g., PED 710) using the non-PCI list (step 306). If the card data is not referenced by the long IIN list then the card is processed normally (i.e. a message is generated to be sent to the POS client that includes the unmasked (clear) IIN with the remainder of the account number masked accompanied by an encrypted copy of the whole PAN. Alternatively, if the card data is referenced by the long IIN list then a reference ID identifying the card issuer is identified in the long IIN list, and a message is generated that includes the reference ID as well as the standard number of the most significant digits of the IIN in the clear with the remainder of the account number including the extra IIN digits masked accompanied by an encrypted copy of the whole PAN. In other words, in this scenario the additional least significant extra digits of the long IIN are masked but because of the accompanying identifier, the POS client can still determine the card issuer identity. This allows business logic to be run that requires the card issuer identity while still complying with industry security standards. At step 308, the card data module 130 further examines the data from the user card for non-compliance with a pre-defined criteria at the POS client (e.g., POS client 715). For example, the card data may be examined for compliance with company or industry criteria as to whether it may be transmitted in the clear, or at all to an external destination. If non-compliant data is found, an alert may be generated. In one embodiment, the alert may be digitally signed.

The communication module 140 transmits the data to an external server (e.g., server 730) for authorization for a payment transaction (step 310).

Figure 4:
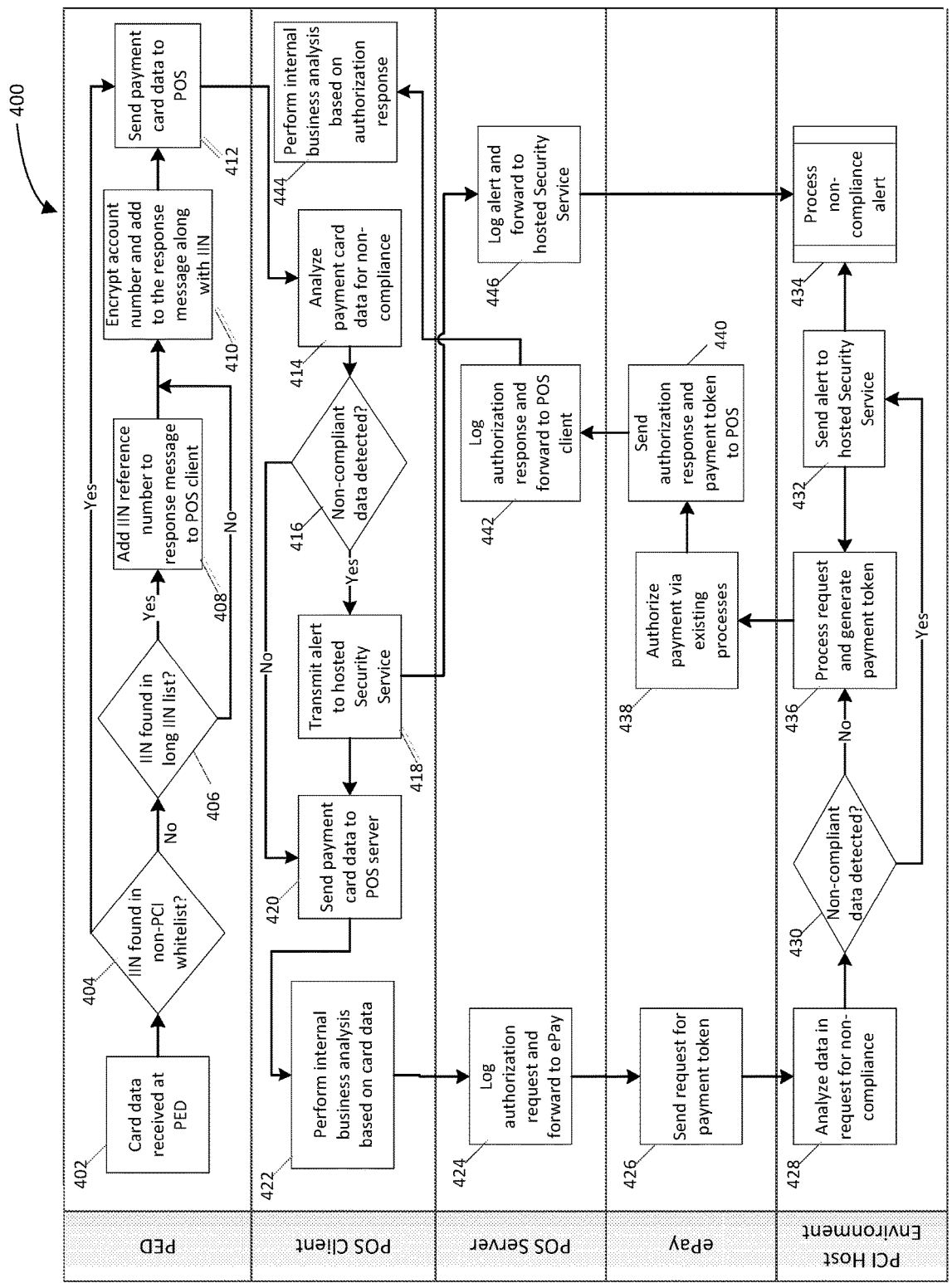
FIG. 4 is a flowchart showing an exemplary method for flexibly securing card data, according to an example embodiment utilizing both a non-PCI whitelist and a long IIN list.

In one embodiment, a PED may utilize both a non-PCI whitelist and a long IIN list to determine whether to secure data. FIG. 4 is a flow chart showing an exemplary method 400 for flexibly securing card data using both a non-PCI whitelist and a long IIN list. The method 400 may be performed using the modules in the flexible card data security system 100 shown in FIG. 1. The exemplary method 400 begins by the PED (e.g., PED 710) receiving user card data, which may be available as track data if the user swipes the card at the PED or it may be available as keyed data if the user enters the card data (e.g., account number, expiration date, card verification value (CVV)) via the number pad of the PED (step 402).

The method 400 continues with the PED analyzing the IIN of the user card in view of the non-PCI list (step 404). The non-PCI list is stored at the PED. The PED may compare the IIN of the user card with the non-PCI list to determine whether the type of user card is referenced by the non-PCI list. If the user card is found on the non-PCI list, then the method 400 jumps to step 412 because the card is not subject to PCI data security standards and its information does not need to be encrypted or masked. Alternatively, if the user card is not found on the non-PCI list, then the method 400 continues to step 406. At step 406, the PED analyzes the IIN obtained from the user card data in view of the long IIN list. The long IIN list is stored at the PED. The PED may compare the IIN of the user card with the long IIN list to determine whether the IIN exists on the long IIN list. If the IIN list is not found on the long IIN list, then the method jumps to step 410 and the PED masks the account number obtained from the user card data (except for the standard number of IIN digits) in compliance with the PCI security guidelines. The clear IIN with the remainder of the account number masked and an encrypted copy of the entire PAN can be transmitted to the POS client in a message in step 412. Alternatively, if the IIN of the user card is on the long IIN list, then at step 408, the PED adds a reference identifier corresponding to the IIN to a response message that is to be transmitted to the POS client and the PED masks the account number, including the non-standard portion of the IIN obtained from the user card data, in the response message in compliance with the PCI security guidelines (in step 410). The identifier, the standard portion of the IIN, the masked remainder of the account number and an encrypted copy of the entire PAN are transmitted to the POS client in a message in step 412.

At step 414, the POS client analyzes the response message from the PED for non-compliant data. If the POS client detects non-compliant data (step 416), an alert is generated and transmitted to the POS server (step 418). At step 446, the POS server logs the alert and forwards the alert to the external PCI host environment (e.g., external server 730).

If the POS client does not detect non-compliant data at 416, then the method 400 jumps to step 420. At step 420, the POS client transmits the card data to the POS server. In some embodiments, the POS client only transmits the card data to the POS server, without data related to the long IIN identifier. At step 422, the POS client performs internal business logic using the information included in the response message. For example, the internal business logic performed by the POS client may include determining whether to offer cash back based on the type of user card, or whether to offer special rates for particular categories of items (e.g., interest free for electronics).

The POS client may perform business logic using clear data if the card data exists in the non-PCI list. The POS client may perform business logic using the long IIN identifier and the masked account number.

The method 400 continues at step 424, where the POS server logs an authorization request and forwards the authorization request to a payment system (e.g., payment system 740). The payment system sends a request for a payment token to the PCI host environment (e.g., external server 730). At step 428, the PCI host environment analyzes the inbound authorization data including the card data for non-compliant data. If non-compliant data is found (step 430), an event is transmitted to a hosted security service at step 432. The PCI host environment processes the non-compliant alert received from the POS server from step 446 and the alert generated at step 432. If non-compliant data is not found, then the method continued to step 436. At step 436, the PCI host environment processes the request and generates a payment token.

The payment token is transmitted to the payment system, and the payment system authorizes payment (step 438). The authorization response and payment token are sent to the POS server (step 440). The POS server logs the authorization response at step 442, and forwards to the POS client. The POS client performs internal business logic on the authorization response at step 444. For example, the internal business logic performed by the POS client may include determining whether to offer cash back based on the type of user card, or whether to offer special rates for particular categories of items (e.g., interest free for electronics), and determine whether these actions are authorized.

Figure 5:
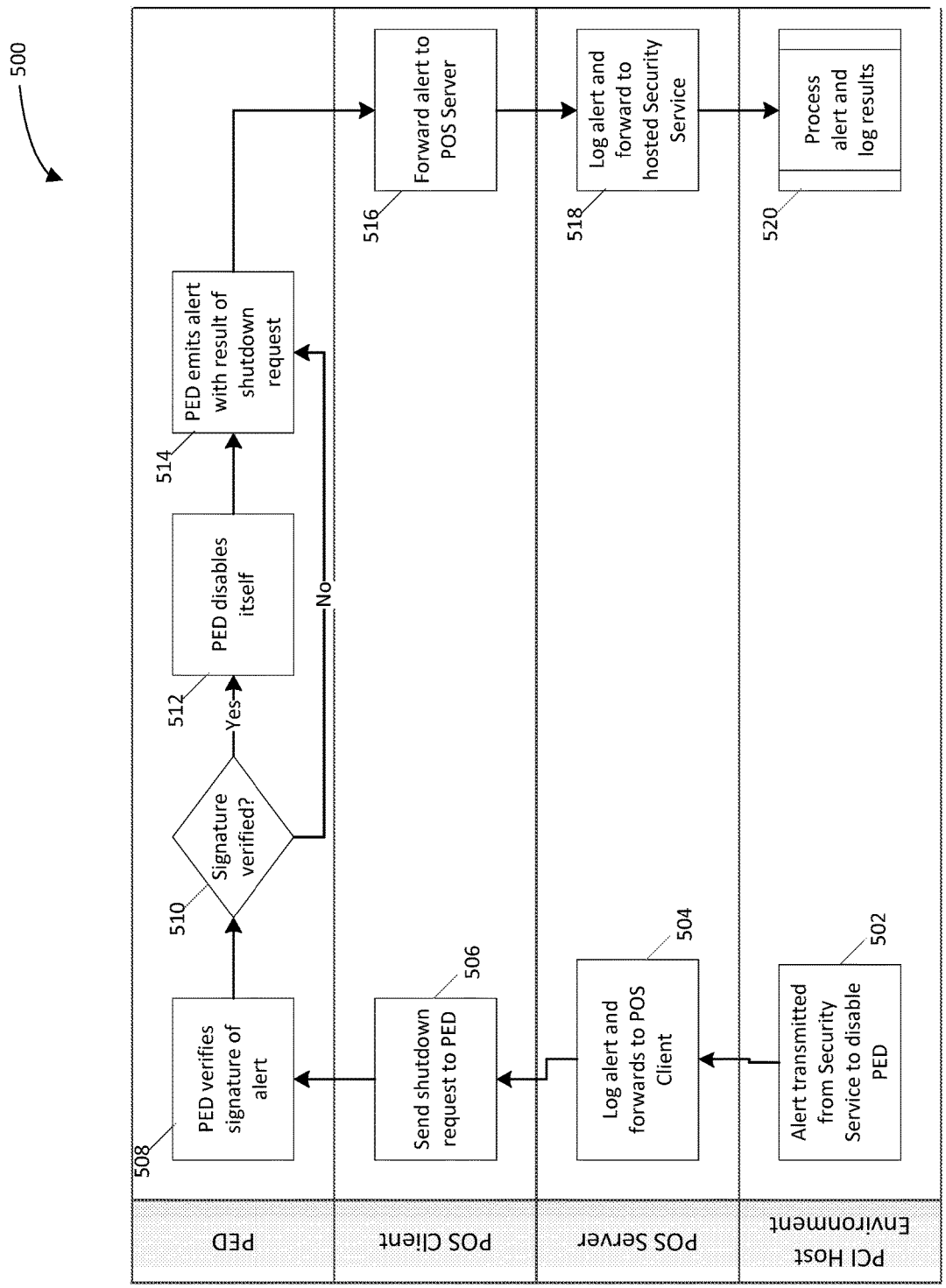
FIG. 5 is flowchart showing an exemplary method for disabling a pin entry device, according to an example embodiment.

FIG. 5 is flowchart showing an exemplary method 500 for disabling a pin entry device, according to an example embodiment. The exemplary method 500 begins with the PCI host environment transmitting an alert to disable the PED to the POS server (step 502). At step 504, the POS server logs the alert and forwards to the POS client. The POS client transmits a shutdown request to the PED (step 506). The PED verifies the digital signature of the alert transmitted from the POS client (step 508). If the PED verifies the digital signature (step 510), the method 500 continues to step 512. If the PED is unable to verify the digital signature (step 510), the method jumps to step 514, and the PED ignores the alert and deletes it. At step 512, the PED disables itself. At step 514, the PED transmits an alert to the POS client with the result of the shutdown request.

The POS client forwards the alert to the POS server (step 516). The POS server logs the alert and forwards to the PCI host environment (step 518). At step 520, the PCI host environment processes the alert and logs the results.

Figure 6:
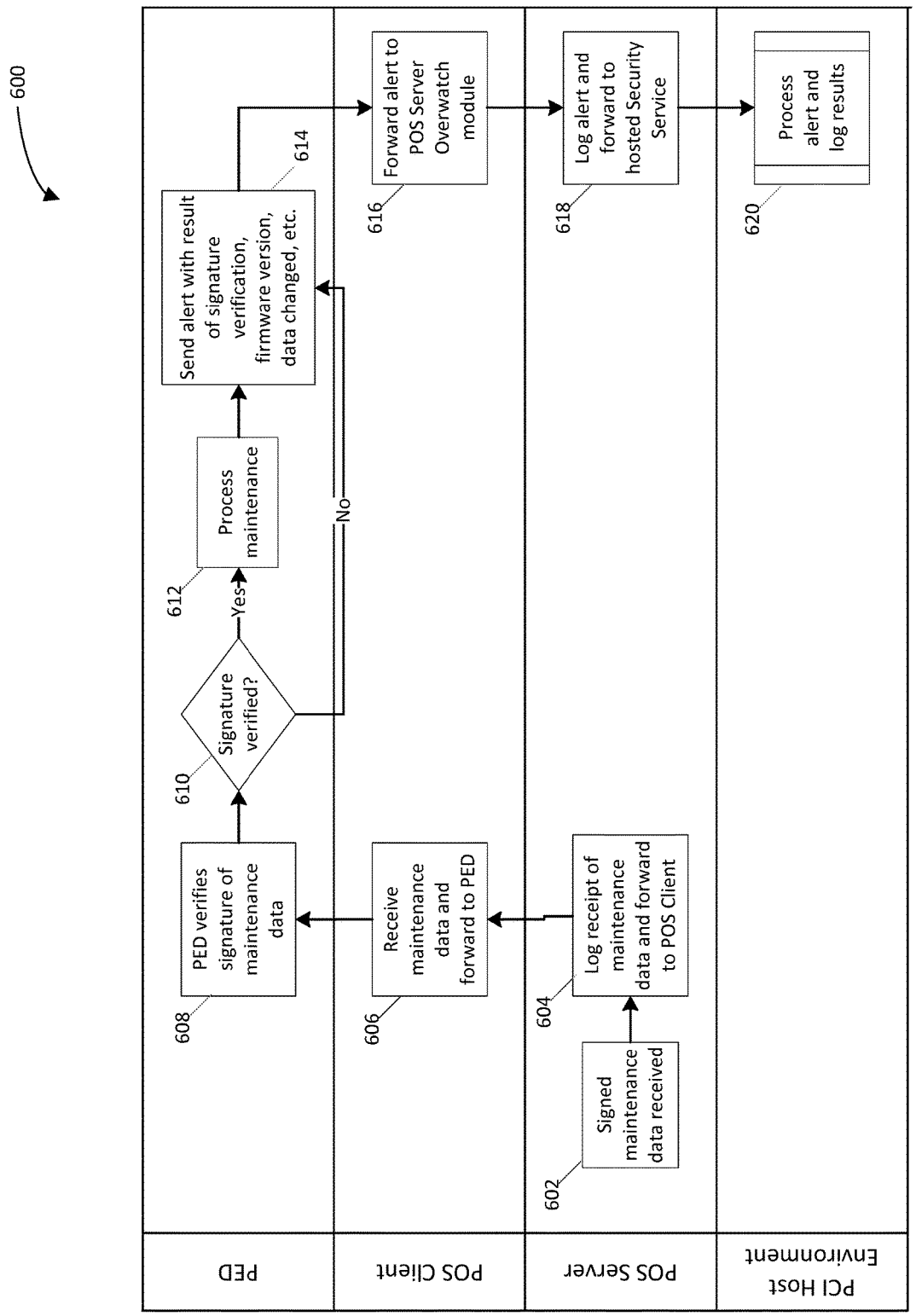
FIG. 6 is a flowchart showing an exemplary method for maintaining a pin entry device, according to an example embodiment.

FIG. 6 is a flowchart showing an exemplary method 600 for maintaining a pin entry device, according to an example embodiment. The exemplary method 600 begins when the POS server receives a signed maintenance data file that may include a non-PCI list, a long IIN list and/or updates to firmware (step 602). The POS server logs receipt of the maintenance data file, and forwards to the POS client (step 604). The POS client receives the maintenance data file and forwards to the PED (step 606).

At step 608, the PED verifies the digital signature of the maintenance data file. If the digital signature is verified (step 610), then the method 600 continues to step 612. If the PED is unable to verify the digital signature (step 610), then the method 600 jumps to step 614, and the maintenance data file is ignored and deleted. At step 612, the PED processes the maintenance data file. The PED may replace or update the existing non-PCI list, replace or update the long IIN list and/or replace or update firmware with the lists and firmware included in the maintenance data file. At step 614, the PED transmits an alert with the result of the digital signature verification, the PED serial number, firmware version, data changes and other information related to maintenance of the PED. The alert is transmitted to the POS client, and the POS client may add the register/POS device number and the store number associated with the PED to the alert. The POS client forwards the alert to the POS server (step 616). The POS server logs the alert and forwards to the PCI host environment (step 618). The PCI host environment processes the alert and logs the results (step 620).

In this manner, the systems and methods described herein provide for flexible card security based on the type of the user card. Conventional payment transaction processes encrypt the card data at the PED, and transmit the encrypted data to a POS device. In the conventional processes, the data is decrypted outside of the POS device to adhere to PCI standards and to obtain account number and card information for internal business analysis. Instead, the card data security system described herein analyzes the card data at the PED and flexibly masks the card data, if necessary, and sends the card data to the POS client for internal business analysis. Doing so saves processing time in that not all card data needs to be masked or encrypted and then decrypted for internal business analysis. Further, internal business logic being performed at a POS client that requires clear data may still be performed.

Figure 7:
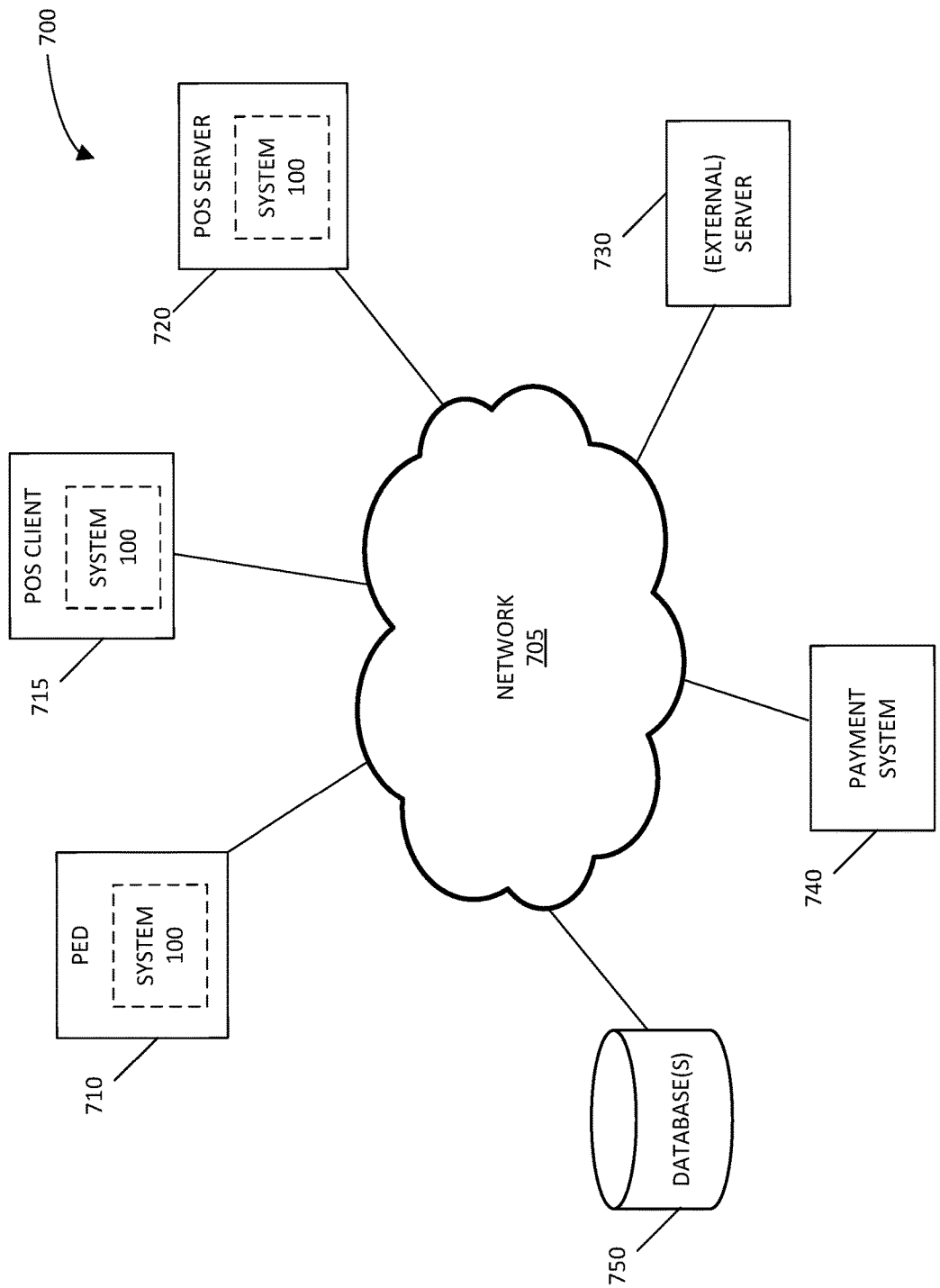
FIG. 7 illustrates a network diagram depicting a system for implementing the card security system, according to an example embodiment.

FIG. 7 illustrates a network diagram depicting a system 700 for implementing the card data security system, according to an example embodiment. The system 700 can include a network 705, PED 710, POS client 715, POS server 720, external server 730, payment system 740, and database(s) 750. Each of components 710, 715, 720, 730, 740, and 750 is in communication with the network 705.

In an example embodiment, one or more portions of network 705 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The PED 710 may comprise, but is not limited to, card readers, pin pads, signature pads, signature pens, Square™ registers, LevelUp™ platform, cash or change deposit devices, cash or change dispensing devices, coupon accepting devices, and the like.

The POS client 715 may comprise, but is not limited to, cash registers, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, tablets, netbooks, and the like. The POS client 715 is part of a store infrastructure and aid in performing various transactions related to sales and other aspects of a store. Being part of a store's infrastructure, the POS client 715 may be installed within the store or they may be installed or operational outside of the store. For example, the POS client 715 may be a mobile device that a store employee can use outside of the store to perform transactions or other activities. In another example, the POS client 715 may be a kiosk installed outside the store. Similarly, the POS client 715 may be a mobile device that can be used within the store, and is not physically installed or attached to one particular location within the store. The POS client 715 can include one or more components described in relation to computing device 800 shown in FIG. 8.

The POS client 715 may also include various external or peripheral devices to aid in performing sales transactions and other duties. Examples of peripheral devices include, but are not limited to, barcode scanners, cash drawers, monitors, touch-screen monitors, clicking devices (e.g., mouse), input devices (e.g., keyboard), receipt printers, coupon printers, payment terminals, and the like. Examples of payment terminals include, but are not limited to, card readers, pin pads, PEDs (e.g., PED 710), signature pads, signature pens, Square™ registers, LevelUp™ platform, cash or change deposit devices, cash or change dispensing devices, coupon accepting devices, and the like.

The POS client 715 may connect to network 705 via a wired or wireless connection. The POS client 715 may include one or more applications such as, but not limited to, a payment transaction application and the card data security system described herein. The POS client 715 may also include an interface application that provides interfacing capabilities between the POS client and external devices such as PEDs. The interface application may analyze and manage data communications between the POS devices and the PED. The POS client 715 may also include an alert application that analyzes data communications between the POS client and the PED, and alerts the POS server if data inbound from the PED is non-compliant with the PCI standards, alerts the POS server on significant events such as device update information, device serial number, firmware version changes, data files validated and installed, and the like, and transmits signed alerts and data files to the PED.

The POS server 720 may include an alert application that is an intermediary between the POS client alert application and the external server 730 (e.g., PCI host environment discussed in relation to FIGS. 4-6). The alert application of the POS server 720 collects and manages the alerts from the POS client 715 and transmits them to the external server 730, and distributes maintenance files and data from the external server 730 to the POS client 715 for processing and installation.

In an example embodiment, the PED 710 and the POS client 715 may perform all the functionalities described herein. In other embodiments, the card data security system may be included on the PED 710 and the POS client 715, and the POS server 720 performs the functionalities described herein. In yet another embodiment, the PED 710 and the POS client 715 may perform some of the functionalities, and POS servers 720 performs the other functionalities described herein.

Each of the database(s) 750, POS server 720 and external server 730 is connected to the network 705 via a wired connection. Alternatively, one or more of the database(s) 750, POS server 720, and external server 730 may be connected to the network 705 via a wireless connection. POS server 720 and external server 730 comprises one or more computers or processors configured to communicate with POS client 715, payment system 740 and database(s) 750 via network 705. POS server 720 and external server 730 hosts one or more applications or websites accessed by POS client 710 and payment system 740 and/or facilitates access to the content of database(s) 750. Database(s) 750 comprise one or more storage devices for storing data and/or instructions (or code) for use by POS server 720, external server 730, PED 710 and/POS client 715. Database(s) 750, and/or servers 720, 730, may be located at one or more geographically distributed locations from each other or from POS client 715. Alternatively, database(s) 750 may be included within servers 720, 730.

Figure 8:
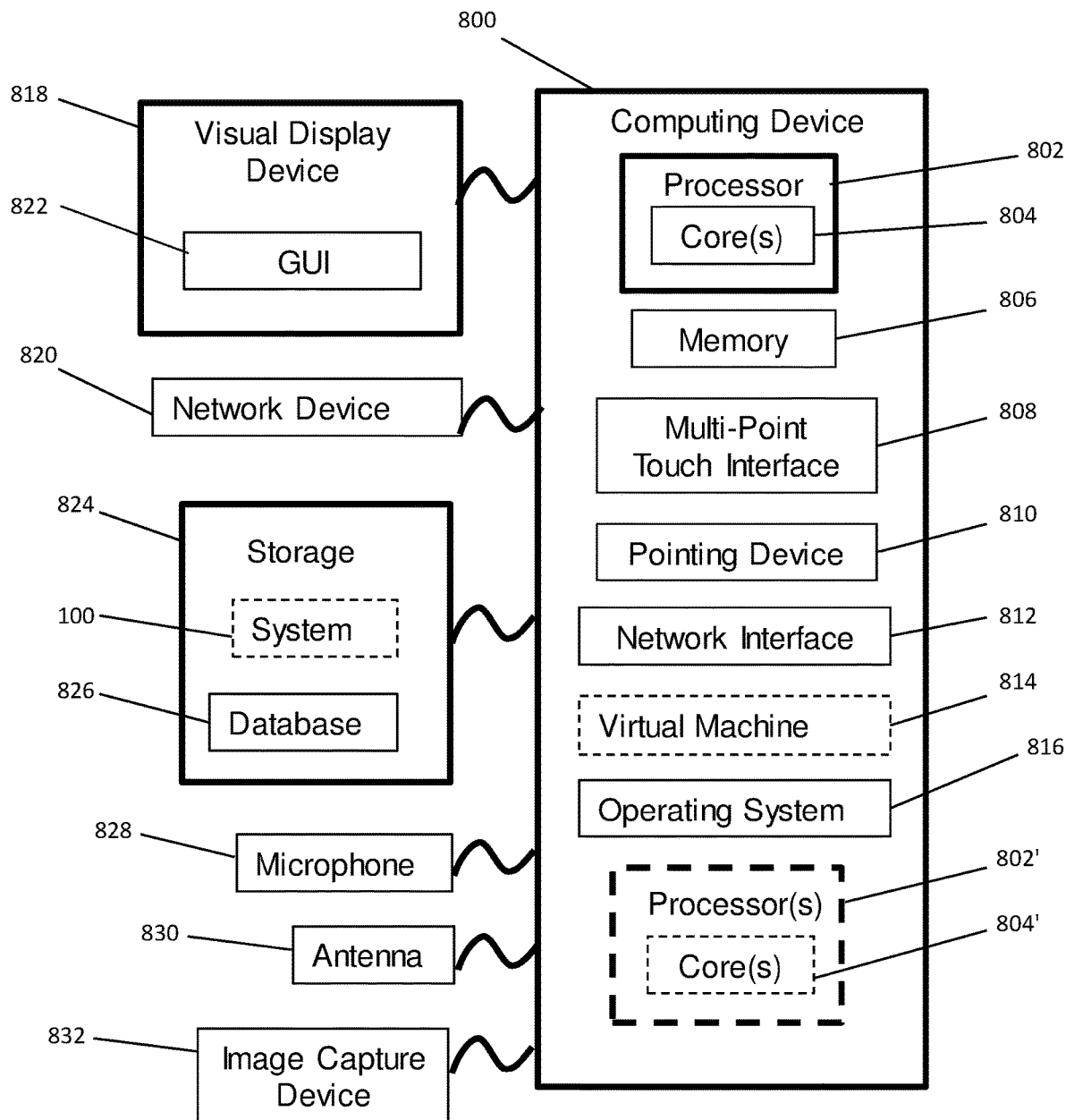
FIG. 8 is a block diagram of an exemplary computing device that can be used to implement exemplary embodiments of the card securing system described herein.

FIG. 8 is a block diagram of an exemplary computing device 800 that may be used to implement exemplary embodiments of the card data security system 100 described herein. The computing device 800 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 806 included in the computing device 800 may store computer-readable and computer-executable instructions or software for implementing exemplary embodiments of the card data security system 100. The computing device 800 also includes configurable and/or programmable processor 802 and associated core 804, and optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for controlling system hardware. Processor 802 and processor(s) 802' may each be a single core processor or multiple core (804 and 804') processor.

Virtualization may be employed in the computing device 800 so that infrastructure and resources in the computing device may be shared dynamically. A virtual machine 814 may be provided to handle a process running on multiple processors so that the process appears to be using only one computing resource rather than multiple computing resources. Multiple virtual machines may also be used with one processor.

Memory 806 may include a computer system memory or random access memory, such as DRAM, SRAM, EDO RAM, and the like. Memory 806 may include other types of memory as well, or combinations thereof.

A user may interact with the computing device 800 through a visual display device 818, such as a computer monitor, which may display one or more graphical user interfaces 822 that may be provided in accordance with exemplary embodiments. The computing device 800 may include other I/O devices for receiving input from a user, for example, a keyboard or any suitable multi-point touch interface 808, a pointing device 810 (e.g., a mouse), a microphone 828, and/or an image capturing device 832 (e.g., a camera or scanner). The multi-point touch interface 808 (e.g., keyboard, pin pad, scanner, touch-screen, etc.) and the pointing device 810 (e.g., mouse, stylus pen, etc.) may be coupled to the visual display device 818. The computing device 800 may include other suitable conventional I/O peripherals.

The computing device 800 may also include one or more storage devices 824, such as a hard-drive, CD-ROM, or other computer readable media, for storing data and computer-readable instructions and/or software that implement exemplary embodiments of the card data security system 100 described herein. Exemplary storage device 824 may also store one or more databases for storing any suitable information required to implement exemplary embodiments. For example, exemplary storage device 824 can store one or more databases 826 for storing information, such as the non-PCI list, the IIN list, masked user card data, criteria for compliance, and/or any other information to be used by embodiments of the system 100. The databases may be updated manually or automatically at any suitable time to add, delete, and/or update one or more items in the databases.

The computing device 800 can include a network interface 812 configured to interface via one or more network devices 820 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 800 can include one or more antennas 830 to facilitate wireless communication (e.g., via the network interface) between the computing device 800 and a network. The network interface 812 may include a built-in network adapter, network interface card, PCMCIA network card, card bus network adapter, wireless network adapter, USB network adapter, modem or any other device suitable for interfacing the computing device 800 to any type of network capable of communication and performing the operations described herein. Moreover, the computing device 800 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the operations described herein.

The computing device 800 may run any operating system 816, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 816 may be run in native mode or emulated mode. In an exemplary embodiment, the operating system 816 may be run on one or more cloud machine instances.

The following description is presented to enable any person skilled in the art to create and use a computer system configuration and related method and article of manufacture to flexibly secure card data. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A system for flexibly securing data, the system comprising:
   a data entry device (DED) in communication with a computing device and configured to:
   receive a security industry whitelist and an originator list, the security industry whitelist referencing types of data not subject to industry-defined security standards, the originator list containing card Issuer Identification Numbers (IINs) that use a greater number of digits than a Payment Card Industry (PCI) standard-defined number of digits and require non-standard handling to comply with a PCI security guideline;
   acquire data from a user;
   analyze the data from the user using at least one of the security industry whitelist and the originator list, a result of the analyzing controlling a masking level of the data; and
   transmit the data with the controlled masking level to the computing device; and
   the computing device configured to:
   examine the data from the user for non-compliance with a pre-defined criteria; and
   transmit the data to an external server for authorization after analysis.

2. The system of claim 1, wherein the data from the user is analyzed at the DED using the security industry whitelist, and the DED is further configured to:
   determine that the type of the user data is referenced by the security industry whitelist; and
   generate, in response to the determining, a message containing the user data in clear form.

3. The system of claim 1, wherein the data from the user is analyzed at the DED using the security industry whitelist, and the DED is further configured to:
   determine that the type of data is not referenced by the security industry whitelist; and
   analyze the data from the user using the originator list in response to the determination that the type of the user data is not referenced by the security industry whitelist.

4. The system of claim 3, wherein the DED is further configured to:
   determine that an originator of the user data is referenced by the originator list; and
   generate, in response to determining that the originator of the user data is referenced by the originator list, a message containing the data from the user, the message including an account number from the data that is at least partially masked, a reference ID indicative of a card issuer of a card on which the data is encoded and an Issuer Identification Number (IIN) from the data that is at least partially masked.

5. The system of claim 3, wherein the DED is further configured to:
   determine that the originator of the user data is not present on the originator list; and
   generate, in response to determining that the originator is not on the originator list, a message containing the data from the user, the message including a masked account number from the data that is at least partially masked and a completely unmasked IIN number.

6. The system of claim 1, wherein prior to the DED receiving the signed shutdown request, the computing device is further configured to:
   receive at the computing device a message including at least some of the data from the user;
   inspect the received data for non-compliance with the pre-defined criteria; and
   generate the signed alert indicating that the received data from the user is possibly non-compliant with the pre-defined criteria based on the inspection, the signed alert transmitted to the DED.

7. The system of claim 1, wherein the DED:
   receives a signed shutdown request for the DED that was generated in response to a signed alert: generated by the computing device, the signed alert indicating that the received data from the user is possibly non-compliant with a pre-defined criteria;
   verifies the digital signature for the signed shutdown request; and disables the DED in response to verification of the signed shutdown request.

8. The system of claim 1, wherein the DED is further configured to:
   receive a maintenance file containing a signed security industry whitelist and a signed originator list;
   validate the maintenance file based on signatures included in the maintenance file; and
   replace an existing security industry whitelist and originator list on the DED with the security industry whitelist and the originator list included in the maintenance file.

9. A method for flexibly securing data, comprising:
   receiving at a data entry device (DED) a security industry whitelist and an originator list, the security industry whitelist referencing types of data not subject to industry-defined security standards, the originator list containing card Issuer Identification Numbers (IINs) that use a greater number of digits than a Payment Card Industry (PCI) standard-defined number of digits and require non-standard handling to comply with a PCI security guideline;
   acquiring data from a user via the DED, the DED in communication with a computing device;
   analyzing the data from the user at the DED using at least one of the security industry whitelist and the originator list, a result of the analyzing controlling a masking level of the data;

transmitting the data with the controlled masking level to the computing device;

examining the data from the user for non-compliance with a pre-defined criteria at the computing device;

transmitting the data to an external server for authorization after the analyzing.

10. The method of claim 9, wherein the data from the user is analyzed at the DED using the security industry whitelist and, further comprising:

determining that the type of data is referenced by the security industry whitelist; and generating, in response to the determining, a message containing the user data in clear form.

11. The method of claim 9, wherein the data from the user is analyzed at the DED using the security industry whitelist and further comprising:

determining that the type of the data is not referenced by the security industry whitelist; and analyzing the data from the user at the DED using the originator list in response to the determination that the type of the user data is not referenced by the security industry whitelist.

12. The method of claim 11, further comprising:

determining that the originator of the data is referenced by the originator list; and generating, in response to determining that the originator of the user data is referenced by the originator list, a message containing the data from the user, the message including an account number from the data that is at least partially masked, a reference ID indicative of an issuer of a card on which the data is encoded and an Issuer Identification Number (TIN) number from the data that is at least partially masked.

13. The method of claim 11, further comprising:

determining that the originator of the user data is not referenced by the originator list; and generating, in response to determining that the originator of the user data is not referenced by the originator list, a message containing the data from the user, the message including an account number from the data that is at least partially masked and a completely unmasked IIN number.

14. The method of claim 9, wherein prior to the DED receiving the signed shutdown request, the method further comprises:

receiving at the computing device a message including at least some of the data from the user;

inspecting the received data for non-compliance with the pre-defined criteria; and generating, at the computing device, based on the inspecting, the signed alert indicating that the received data from the user is possibly non-compliant with the pre-defined criteria, the signed alert transmitted to the DED.

15. The method of claim 11, wherein the DED:

receives a signed shutdown request for the DED that was generated in response to a signed alert generated by the computing device, the signed alert indicating that the received data from the user is possibly non-compliant with a pre-defined criteria; and verifies the digital signature for the signed shutdown request; and disables the DED in response to verification of the signed shutdown request.

16. The method of claim 9, further comprising:

receiving a maintenance file at the DED, the maintenance file containing a signed security industry whitelist and a signed originator list;

validating, at the DED, the maintenance file based on signatures included in the maintenance file; and replacing an existing security industry whitelist and originator list on the DED with the security industry whitelist and the originator list included in the maintenance file.

17. A non-transitory computer readable medium storing instructions executable by a processing device, the instructions implementing a method for flexibly securing data, execution of the instructions causing the processing device to:

receive a security industry whitelist and an originator list, the security industry whitelist referencing types of data not subject to industry-defined security standards, the originator list containing card Issuer Identification Numbers (IINs) that use a greater number of digits than a Payment Card Industry (PCI) standard-defined number of digits and require non-standard handling to comply with a PCI security guideline;

acquire data from a user via a pin entry device (DED), the DED in communication with a computing device;

analyze the data from the user using at least one of the security industry whitelist and the originator list, a result of the analyzing controlling a masking level of the data;

transmit the data with the controlled masking level to the computing device;

examine the data from the user for non-compliance with a pre-defined criteria at the computing device; and transmit the data to an external server for authorization after the analyzing.

18. The medium of claim 17, wherein the data from the user is analyzed at the DED using the security industry whitelist and wherein execution of the instructions further cause the processing device to:

determine that the type of the user data is referenced by the security industry whitelist; and generate, in response to the determining, a message containing the user data in clear form.

19. The medium of claim 17, the data from the user is analyzed at the DED using the security industry whitelist and wherein execution of the instructions further cause the processing device to:

determine that the type of the user data is not referenced by the security industry whitelist;

analyze the data from the user at the DED using the originator list in response to the determination that the type of the user data is not referenced by the security industry whitelist;

determine that the originator of the user data is referenced by the originator list; and generate, in response to determining that the originator of the user data is referenced by the originator list, a message containing the data from the user, the message including an account number from the data that is at least partially masked, a reference ID indicative of an issuer of a card on which the data is encoded and an Issuer Identification Number (TIN) number from the data that is at least partially masked.

20. The medium of claim 17, the data from the user is analyzed at the DED using the security industry whitelist and wherein execution of the instructions further cause the processing device to:

determine that the type of the user data is not referenced by the security industry whitelist;

analyze the data from the user at the DED using the originator list in response to the determination that the type of the user data is not referenced by the security industry whitelist;

determine that the originator of the user data is not referenced by the originator list; and generate, in response to determining that the originator of the user data is not referenced by the originator list, a message containing the data from the user, the message including an account number from the data that is at least partially masked and an completely unmasked IIN number.

* * * * *